(12) United States Patent
Gorsica et al.

(10) Patent No.: US 10,649,539 B1
(45) Date of Patent: May 12, 2020

(54) HAND TEMPERATURE COMPENSATION

(71) Applicant: Motorola Mobility LLC, Chicago, IL (US)

(72) Inventors: John J. Gorsica, Chicago, IL (US); Rachid Alameh, Chicago, IL (US); Jenna Zylema, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/293,236

(22) Filed: Mar. 5, 2019

(51) Int. Cl.
| | |
|---|---|
| *G09G 5/00* | (2006.01) |
| *G06F 3/01* | (2006.01) |
| *H04N 5/33* | (2006.01) |
| *G06F 3/0488* | (2013.01) |

(52) U.S. Cl.
CPC ............ *G06F 3/017* (2013.01); *G06F 3/0488* (2013.01); *H04N 5/33* (2013.01)

(58) Field of Classification Search
CPC .......... G06F 3/017; G06F 3/0488; H04N 5/33
USPC .......................................................... 345/156
See application file for complete search history.

(56) References Cited

U.S. PATENT DOCUMENTS

| | | | | |
|---|---|---|---|---|
| 2012/0146903 | A1* | 6/2012 | Arihara ................... | G06F 3/011 345/158 |
| 2015/0023019 | A1* | 1/2015 | Chen ...................... | H05B 47/19 362/276 |
| 2015/0222594 | A1* | 8/2015 | Fritsch .................. | H04L 12/413 370/252 |
| 2016/0105653 | A1* | 4/2016 | Yamamoto ............... | G09G 5/00 348/744 |
| 2018/0143006 | A1* | 5/2018 | White .................... | A61B 5/1114 |
| 2019/0331330 | A1* | 10/2019 | Chen ...................... | F21V 5/007 |

* cited by examiner

*Primary Examiner* — Jonathan M Blancha
(74) *Attorney, Agent, or Firm* — McKinney Phillips LLC; Phillip Pippenger (57) ABSTRACT

Systems and methods for calibrating presence and gesture detection thermal sensors in a mobile electronic communications device entail sensing an ambient temperature and designating the sensed ambient temperature as room temperature, and determining that a user appendage has touched, or is close to but not touching, the thermal sensor. If the user appendage has touched a lens of the thermal sensor, a sensed temperature just prior to that event is used as hand temperature. If the user appendage is close to but not touching the lens of the thermal sensor, the temperature during that event is used as hand temperature. A difference between the hand temperature and the room temperature is then determined and the presence and gesture detection functions for the device are calibrated based on the determined difference.

16 Claims, 8 Drawing Sheets

HAND TEMPERATURE COMPENSATION

TECHNICAL FIELD

The present disclosure is related generally to mobile electronic communications devices and, more particularly, to systems and methods for facilitating user interactions with a user interface of a mobile electronic communications device.

BACKGROUND

As small portable electronic devices become increasingly integrated into users' lives, the frequency of interaction between users and devices has increased greatly. Fortunately, non-textual entry mechanisms have developed to facilitate more seamless and simple user interaction. One of the primary non-textual entry mechanisms is gesture recognition, wherein ideally a device detects a gesture made by the user, e.g., with the user's hands, translates the detected gesture into a desired action, and executes the desired action. For example, a user may make a gesture that corresponds to a command to open the camera app on the device. If the device correctly detects and interprets this gesture, then it will open the camera app without requiring any physical interaction from the user.

However, the usability of such systems depends almost entirely upon the device's ability to correctly detect gestures. Typically, thermal sensors are used for presence detection and hand gesture detection. Such sensors work by measuring a temperature difference between the room or ambient temperature and the user's presumably higher hand temperature. This measurement is a delta measurement that depends upon a difference in temperature, but the measured difference will change with any changes in the user's hand temperature or in the ambient temperature.

In addition, the distance between the sensor and the user's hand also affects the temperature measurement. This is because the thermal sensor takes a measurement in its field of view (FOV). So for example, a close hand takes up a greater portion of the sensor's FOV than the same hand further away. This of course leads to a higher FOV temperature the closer the hand is to the sensor, regardless of the hand's actual temperature.

As a corollary example, a hot hand in a cold room will be accurately detected at a farther distance than a warm hand in the same room. Thus, the range of operation of a gesture detection system may differ among different users in the same room and may even differ for the same user when in different rooms.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objectives and advantages, may be best understood from the following detailed description taken in conjunction with the accompanying drawings of which:

DETAILED DESCRIPTION

Before discussing embodiments of the disclosed principles in full detail, an overview of certain embodiments is given to aid the reader in understanding the later more detailed discussion. As noted above, current gesture detection technologies rely on thermal differencing, leading to anomalous results if conditions are somewhat different than standard conditions. In particular, variations in room temperature and user hand temperature can stack to cause inaccurate gesture detection, and subsequent failure of the device to execute a user command.

In an embodiment of the disclosed principles, additional sensing methods are employed to determine when a user's hand is within a predetermined distance of the thermal sensor, such that the sensor's FOV encompasses primarily the user's hand. The resulting temperature measurement is then used to establish an approximate value for the user's actual hand temperature. This approximate value is then used to automatically modify subsequent thresholds for presence and gesturing, leading to more accurate gesture detection overall, regardless of distance.

The thermal sensor in the described examples is a thermopile, although it will be appreciated that other thermal sensor types may alternatively or additionally be used. As will be discussed in greater detail further below, the thermopile typically includes a lens that shields the component from physical damage. The additional sensor mechanisms, when used, may include a close range IR-proximity sensor, a capacitive sensor or other secondary sensor. Examples of other means for detecting a user hand or finger hovering over or touching the lens of the thermal sensor include ultrasonic sensors, RADAR sensors, light sensors and cameras.

In an embodiment of the disclosed principles, a rate of change of temperature is measured at the thermal sensor and compared to an expected rate of change based on the heat transfer characteristics of the lens and human skin. If the rate of change matches what is expected when a finger is touching the lens, then the device may infer that the user is touching the lens.

In a further embodiment, an IR or capacitive proximity sensor is used to determine that the thermal sensor is covered for purposes of calibrating thresholds for the thermal sensor. In this way, the range of the proximity sensor is set such that the finger (or hand) fills the thermal sensor FOV when the sensor indicates that it is covered. The device may await the first hover/touch event to calibrate the presence or gesture detection system.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Figure 1:
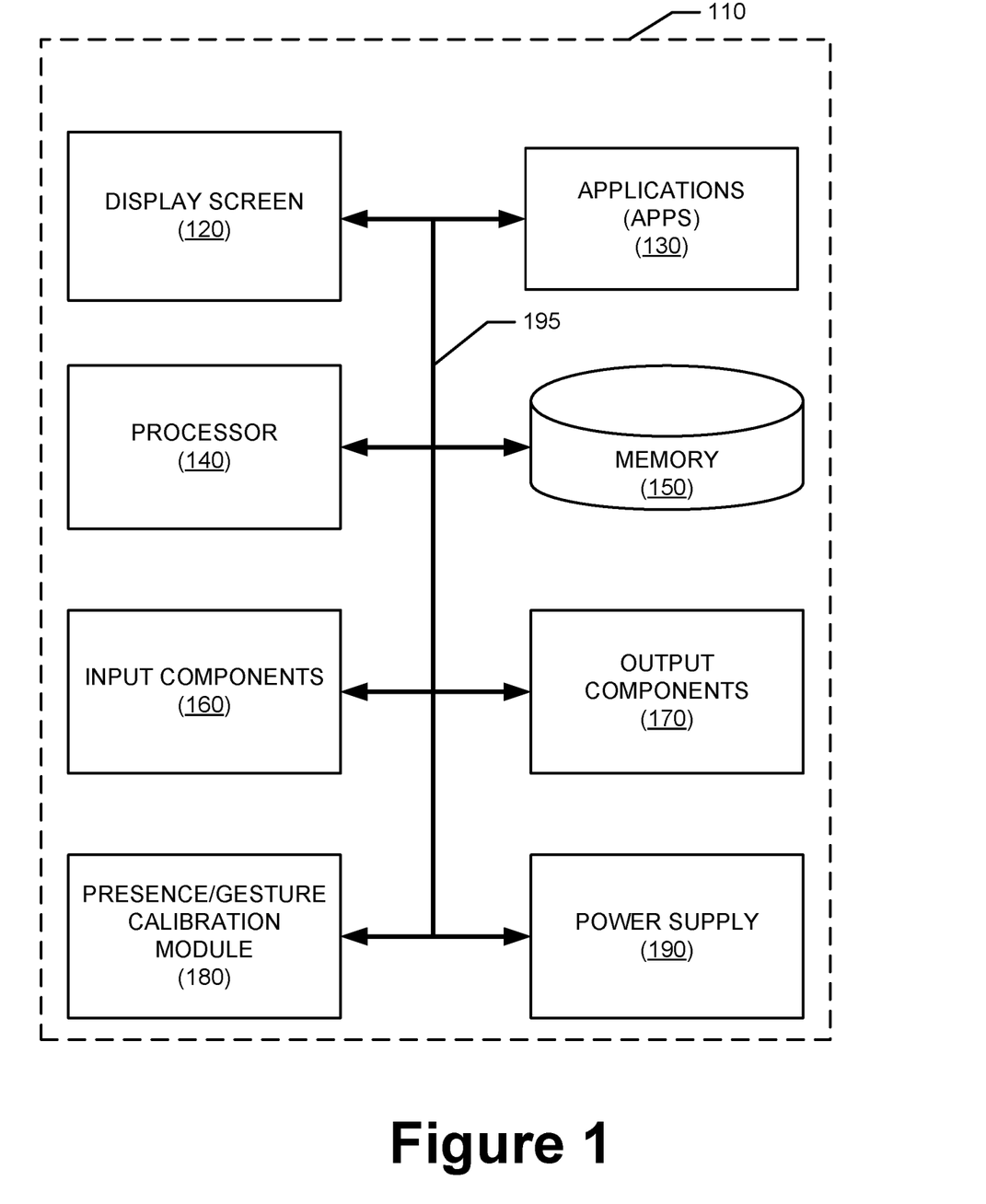
FIG. 1 is a schematic representation of a mobile electronic device in which various embodiments of the disclosed principles may be implemented.

Thus, for example, while FIG. 1 illustrates an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example, one or more antennas and associated circuitry and logic. The antennas and associated circuitry may support any number of protocols, e.g., WiFi, Bluetooth, cellular, etc.

The device 110 as illustrated also includes one or more output components 170 such as RF (radio frequency) or wired output facilities. The RF output facilities may similarly support any number of protocols, e.g., WiFi, Bluetooth, cellular, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments.

In an embodiment, a presence/gesture calibration module 180 reads a thermal sensor on the surface of the device, as well as any secondary sensor, to provide touch detection to detect a user's finger near or on a lens of the thermal sensor. The thermal sensor and secondary sensor may be located anywhere on the outside of the device, e.g., in a location where a user's hand is expected to touch when the device is held.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120.

Figure 2:
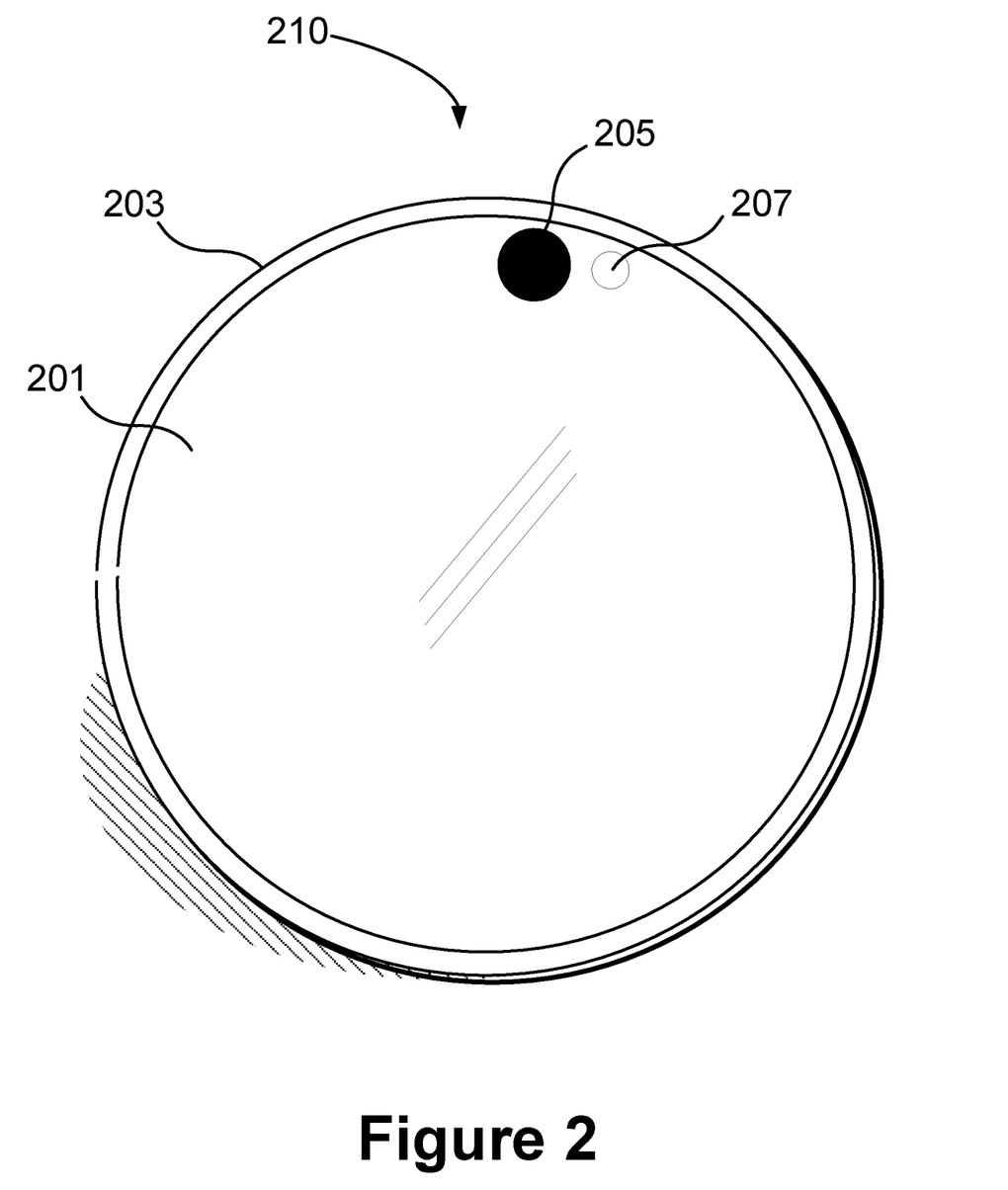
FIG. 2 is a front perspective view of a device within which various embodiments of the disclosed principles may be implemented.

FIG. 2 is a front plan view of an example device 210 (110) in accordance with the described principles. As can be seen, the device 210 optionally includes a display 201 (120) within a device housing or body 203. The device display 201 may or may not be touch-sensitive.

The device 210 is also configured, e.g., via a thermal sensor 205, to detect user presence and user gestures. As noted above, the thermal sensor 205 may be, for example, a thermopile sensor, and may, but need not, include or be located adjacent a secondary sensor 207, such as an IR proximity sensor or a capacitive sensor. As noted in overview above, the thermal sensor 205 is used to provide improved gesture recognition by improving thermal differencing.

In this embodiment, the thermal sensor 205 is employed to determine when a user's hand or finger is within a predetermined distance of the sensor, such that the sensor's FOV encompasses primarily the user's hand/finger. The resulting temperature measurement is then used to establish an approximate value for the user's actual hand temperature. This approximate value is then used to automatically modify subsequent thresholds for presence and gesturing, leading to more accurate gesture detection overall, regardless of distance.

As also noted, in a further embodiment, an IR or capacitive proximity sensor 207 may be used to determine that the thermal sensor 205 is covered for purposes of calibrating thresholds for the hover sensors 205. The device 210 may await the first hover/touch event to calibrate the presence or gesture detection system. The thermal sensor 205 may also be used alone in an embodiment to sense the presence of the user's hand or figure by sensing a time rate of change in the thermal reading. This will be explained in further detail later herein.

Figure 3:
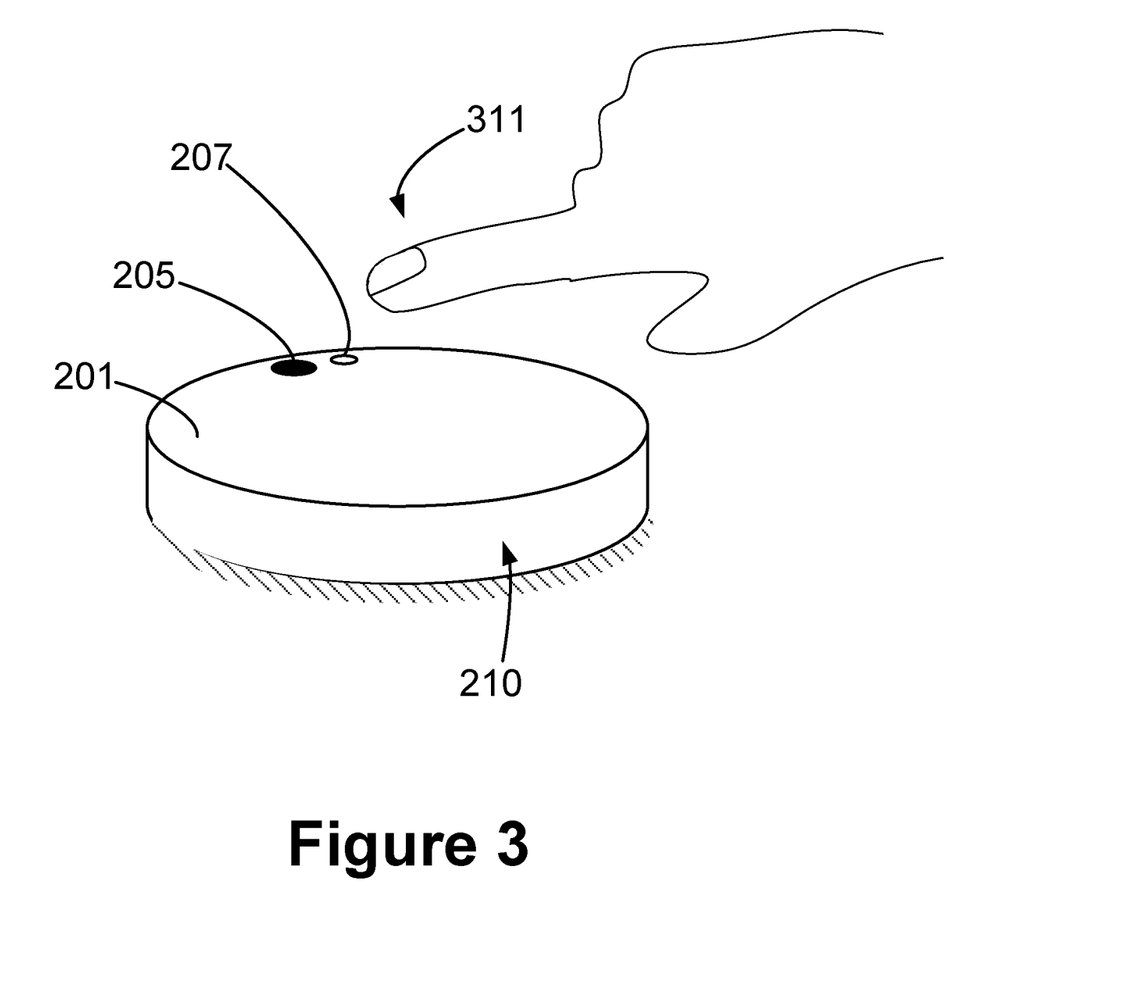
FIG. 3 is side perspective view of the device of FIG. 2 in accordance with an embodiment of the disclosed principles.

Turning to FIG. 3, this figure illustrates the device 210 of FIG. 2 in perspective view, with a user's finger 311 in close proximity to the thermal sensor 205 and secondary sensor 207. As can be seen, the illustrated example device 210 (110) has a disc-like shape, however the described principles apply regardless of shape. For example, the device 210 may instead have a cube, tablet, spherical or other overall shape without decreasing the applicability of the described principles.

In addition to the foregoing, other aspects of the device operation will be appreciated from FIGS. 4-7, which show process flows corresponding with one or more embodiments of the disclosed principles.

Figure 4:
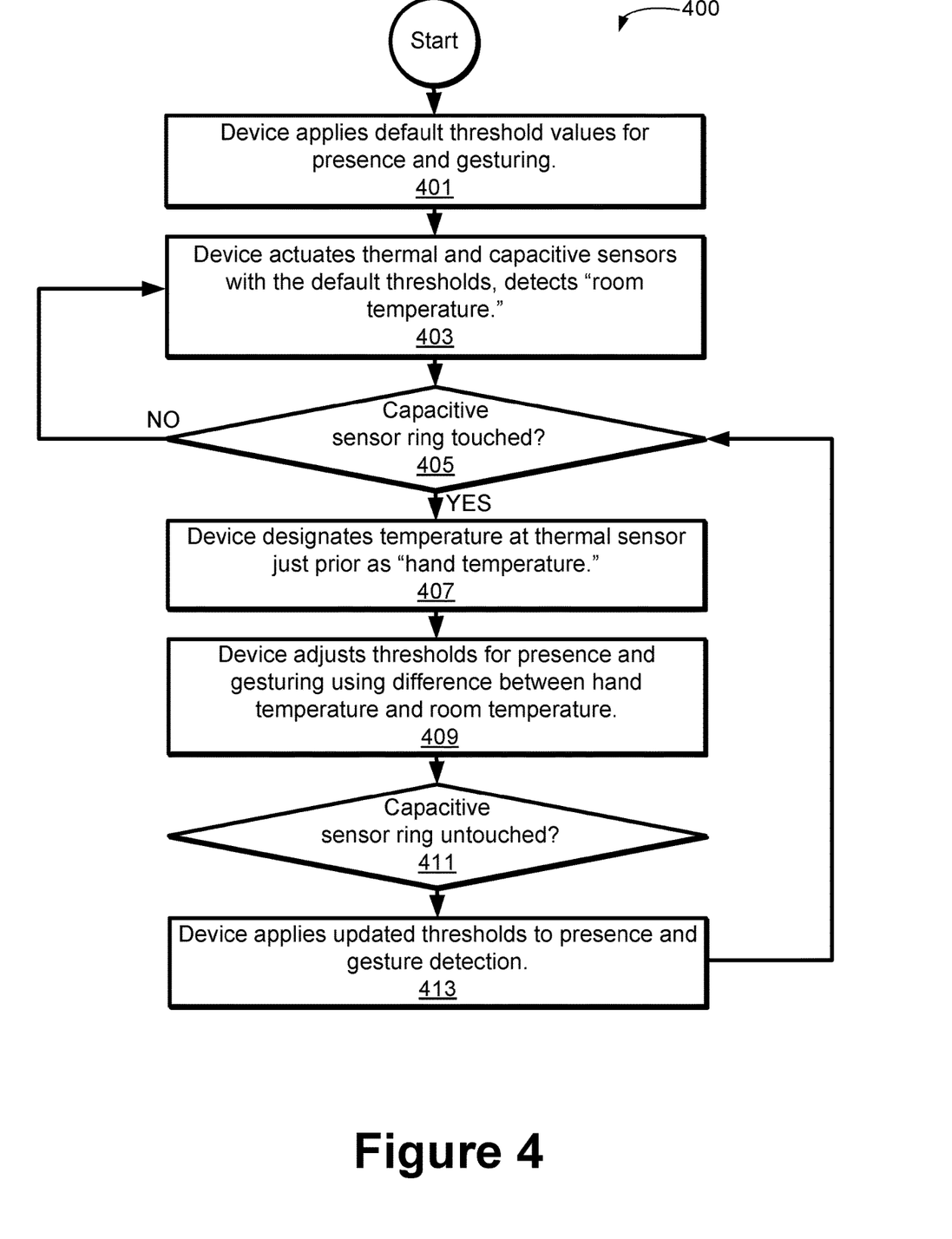
FIG. 4 is a flow chart showing a process of presence and gesture detection calibration in a device having thermal and capacitive sensors in accordance with an embodiment of the disclosed principles.
Figure 8:
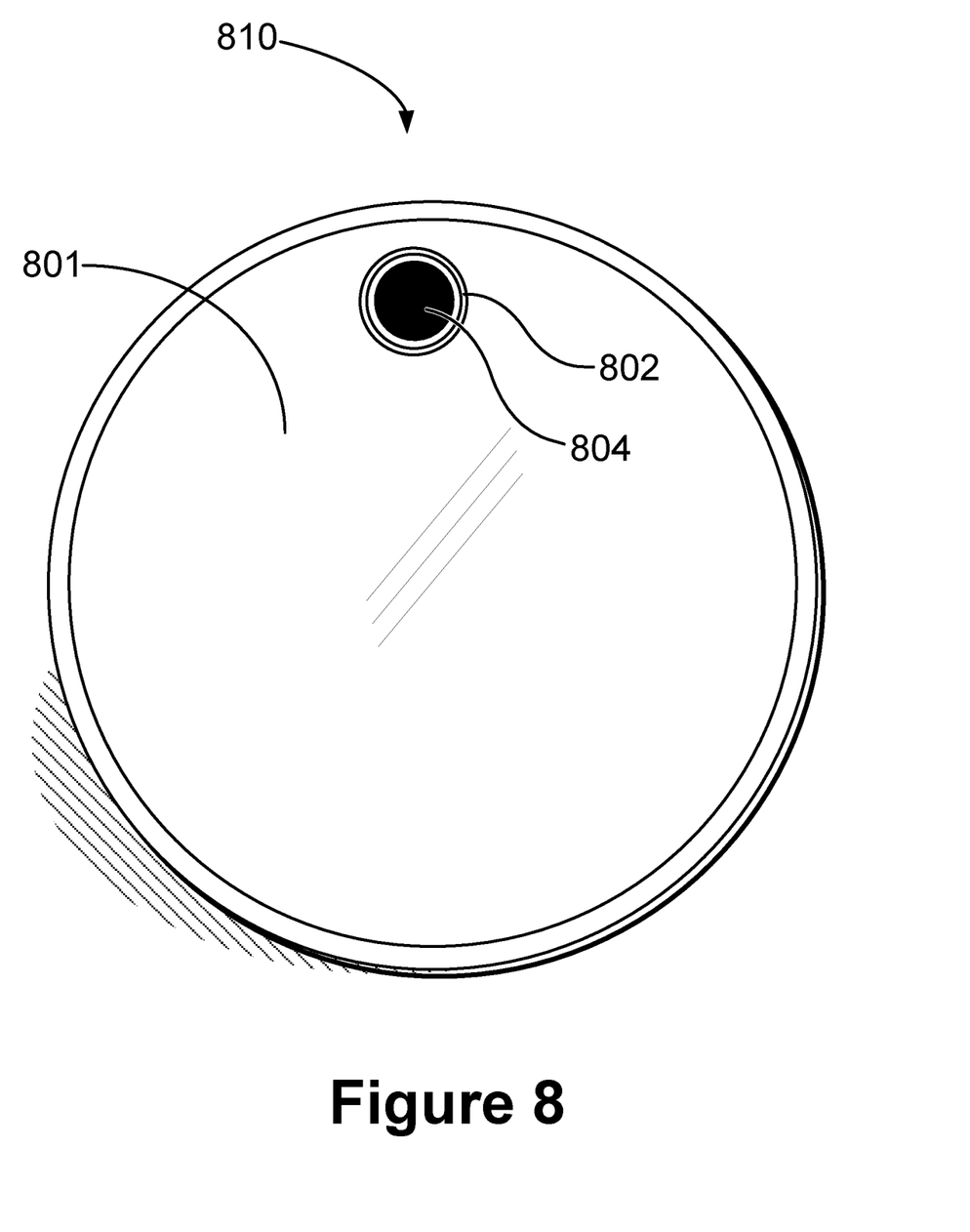
FIG. 8 is a front schematic view of an example device having a capacitive ring in addition to a thermal sensor located on the device in accordance with an embodiment of the disclosed principles.

Turning to FIG. 4, this figure illustrates an example process 400 for hand temperature compensation when the device 210 includes a thermal sensor 205 and a capacitive sensor ring around the thermal sensor 205 (an example of this configuration is shown in FIG. 8). When the process 400 begins at stage 401, the device 210 employs default threshold values (e.g., for temperature difference that triggers presence detection) for presence and gesturing. The default thresholds for presence and gesturing may be manufacturer-supplied, or may correspond to calibrated values from a prior use.

At stage 403, the device 210 actuates the thermal sensor and capacitive sensor ring in accordance with the default thresholds and detects a "room temperature" via the thermal sensor. The device 210 then determines at stage 405 whether the capacitive sensor ring has been touched. If it has not, the process 400 flows back to stage 403 to continue updating the room temperature. However, if it is determined at stage 405 that the capacitive sensor ring has been touched, the process 400 moves forward to stage 407, wherein the device 210 designates the temperature sensed by the thermal sensor just prior to the touch as the "hand temperature."

The device 210 then uses the difference between the hand temperature and the room temperature at stage 409 to adjust the thresholds for presence and gesturing away from the default values. In an embodiment, smaller differences between hand temperature and room temperature result in lower thresholds. Thus, in this example, a smaller temperature difference signal is needed to trigger a presence reading because the actual difference is known to be smaller. As another example, a negative difference, e.g., when hand temperature is less than room temperature, results in a negative difference threshold being applied.

From stage 409, the process 400 moves to stage 411, wherein the device 210 ensures that the touch has ceased, at which point the process 400 moves to stage 413, wherein the device 210 applies the updated thresholds to presence and gesture detection and returns to stage 405.

Figure 5:
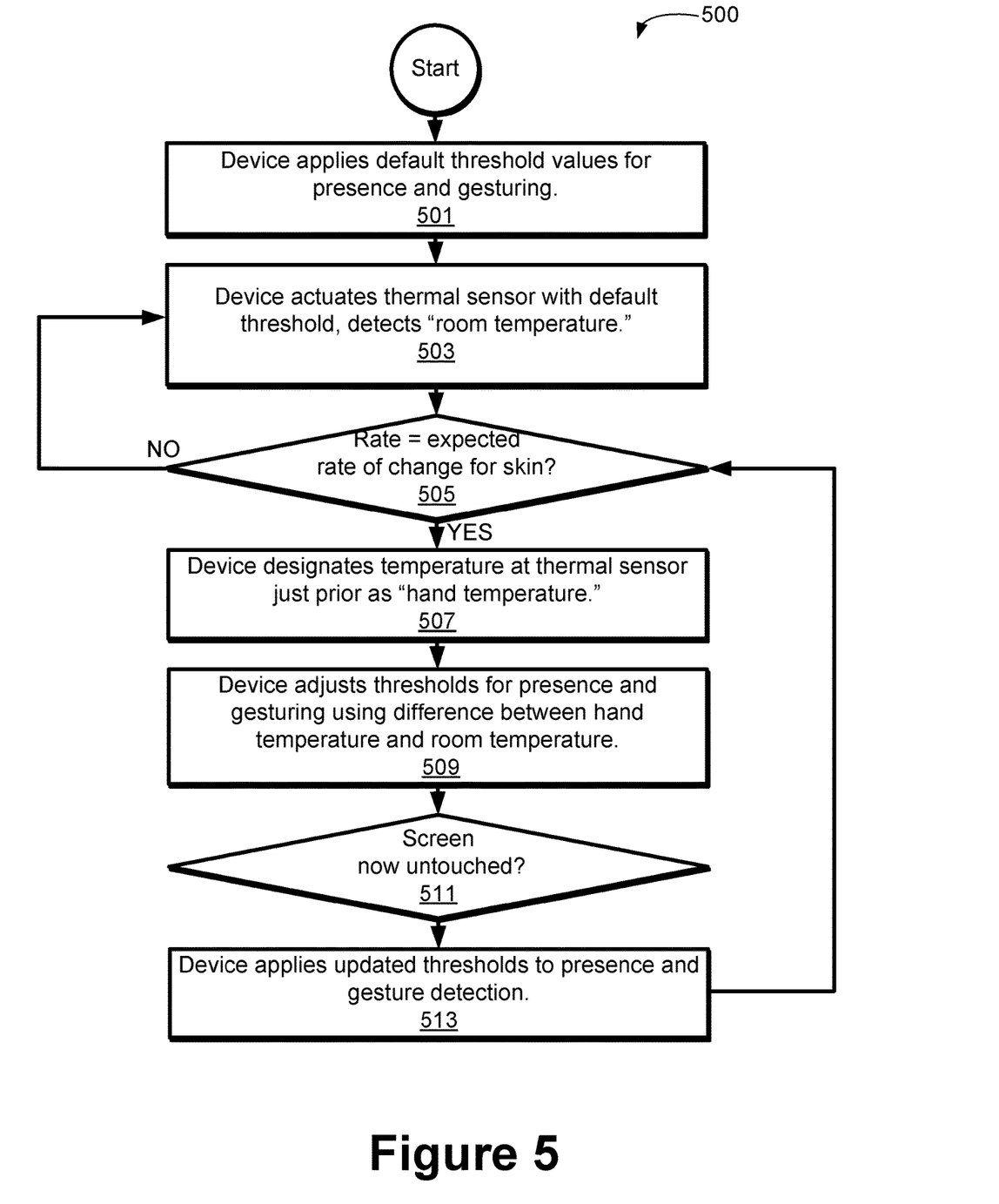
FIG. 5 is a flow chart showing a process of presence and gesture detection calibration using rate of change determination in accordance with an embodiment of the disclosed principles.

Turning to FIG. 5, this figure illustrates an example process 500 for executing hand temperature compensation for a lens touch with a thermal rate accommodation. As noted above, no secondary sensor is needed in this embodiment to detect or infer touch or proximity. The process 500 begins at stage 501, wherein the device 210 applies default threshold values for presence and gesturing. As noted above, the default thresholds for presence and gesturing may be manufacturer-supplied, or may correspond to calibrated values from a prior use.

At stage 503, the device 210 actuates the thermal sensor and detects a "room temperature." The device 210 also monitors the temperature at this stage to detect any change. When a change is detected, the process 500 flows to stage 505, wherein the device 210 determines whether the rate of change is consistent with (e.g., substantially matches in keeping with a match criterion) an expected rate of change for a heat transfer between skin and the lens of the thermal sensor for a minimum time. Those of skill in the art will be aware of the various suitable expressions for determining an expected heat transfer rates between the two bodies.

If the detected rate of change is not consistent with the expected rate of change for a heat transfer between the lens and the user's skin, the process 500 returns to stage 503. Otherwise, the process 500 moves to stage 507, wherein the device 210 determines that the thermal sensor lens has been touched and sets a temperature reading taken just prior to this touch event as "hand temperature." From stage 507, the process 500 flows to stage 509, wherein the device 210 generates new threshold values for presence detection and ensures at stage 511 that the touch has ceased before applying the updated thresholds to presence and gesture detection at stage 513. Finally, the process 500 returns to stage 503.

Figure 6:
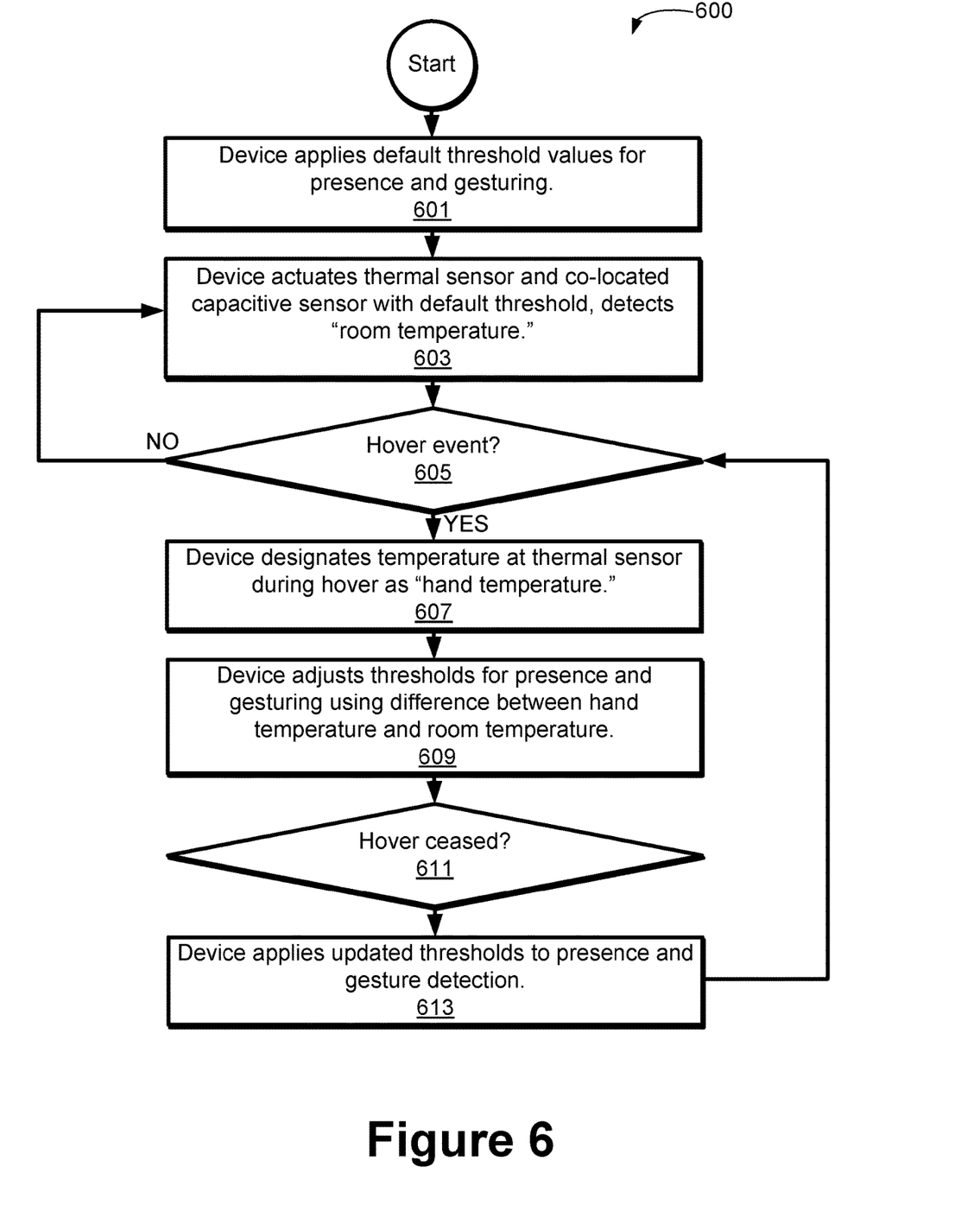
FIG. 6 is a flow chart showing a process of presence and gesture detection calibration in a device having a thermal sensor and co-located capacitive sensor in accordance with an embodiment of the disclosed principles.

Turning to FIG. 6, this figure illustrates an example process 600 for hand temperature compensation in the event of a lens hover with capacitive sensor. FIGS. 2 and 3 show an example of this configuration. As can be seen in that example, the capacitive sensor 207 is located adjacent the thermal sensor 205. The process 600 begins at stage 601 wherein the device 210 applies default threshold values for presence and gesturing. As noted above, the default thresholds for presence and gesturing may be manufacturer-supplied, or may correspond to calibrated values from a prior use.

At stage 603, the device 210 actuates the thermal sensor and a co-located capacitive sensor and detects a "room temperature" via the thermal sensor, the room temperature being the detected long-term background temperature. Moving to stage 605, the device 210 determines whether the capacitive sensor indicates a hover event, that is, an event wherein the user's hand or finger is close to but not touching the thermal sensor. If there has been no such event, the process 600 returns to stage 603. Otherwise, the process 600 flows forward to stage 607 wherein the device 210 designates a temperature reading during the hover event as "hand temperature."

The device 210 then uses the difference between the hand temperature and the room temperature at stage 609 to adjust the thresholds for presence and gesturing, e.g., with smaller differences between hand temperature and room temperature resulting in lower thresholds, and negative differences resulting in negative difference thresholds.

The device 210 then ensures that the hover event has ceased at stage 611 before moving to stage 613 and applying the updated thresholds. From stage 613, the process 600 returns to stage 605.

Figure 7:
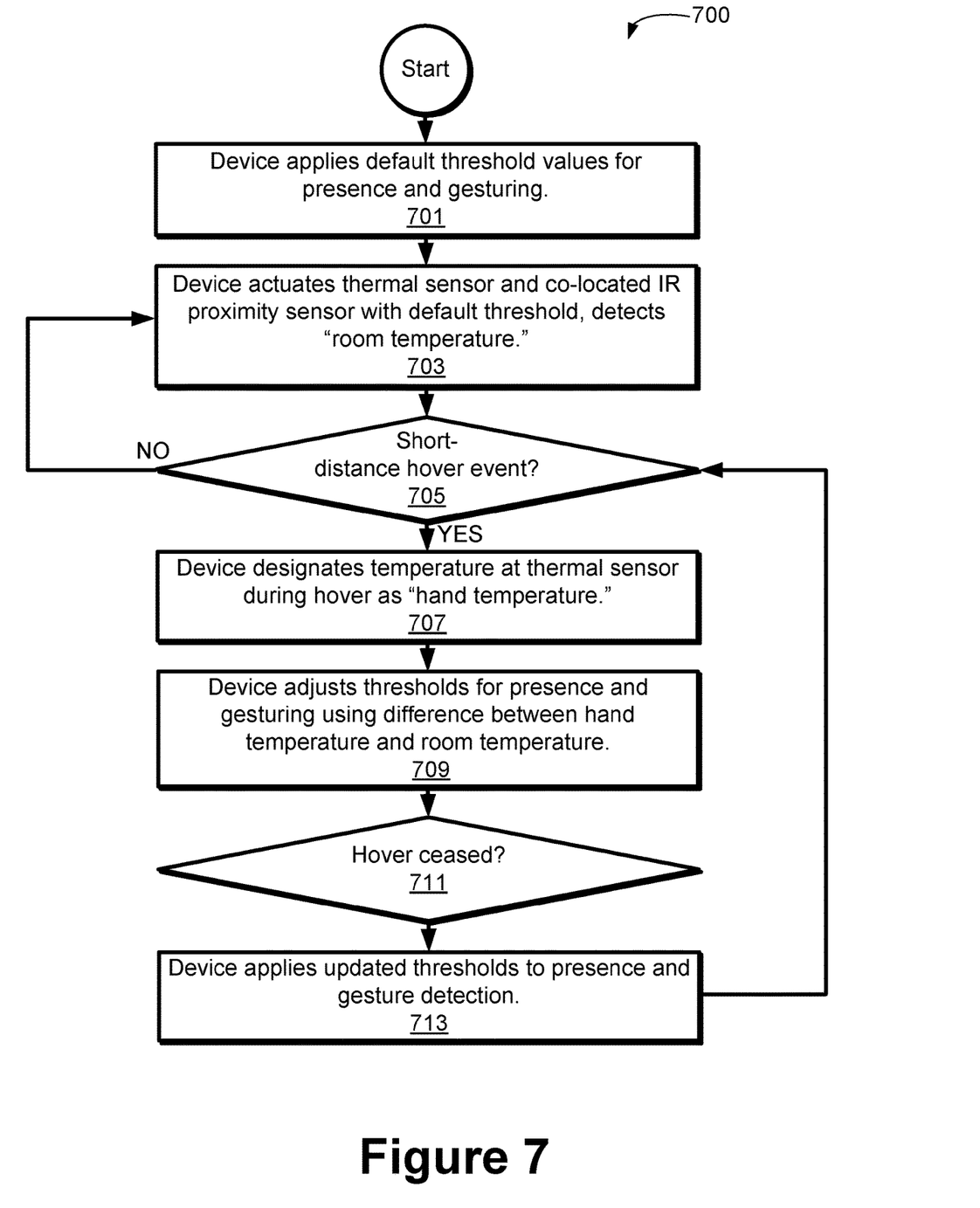
FIG. 7 is a flow chart showing a process of presence and gesture detection calibration in a device having an IR proximity sensor in accordance with an embodiment of the disclosed principles.

Turning to FIG. 7, this figure illustrates an example process 700 for hand temperature compensation for a lens hover with an IR proximity sensor located adjacent to the thermal sensor, similar to FIGS. 2-3. The IR proximity sensor is an active near-IR reflective proximity sensor, with emitter and receiver elements, in contrast to the far-IR (thermal) radiation used by the thermopile sensor that is typically used for the thermal sensor.

The process 700 begins at stage 701, wherein the device 210 applies default threshold values for presence and gesturing. As noted above, the default thresholds for presence and gesturing may be manufacturer-supplied, or may correspond to calibrated values from a prior use. At stage 703, the device 210 actuates the thermal sensor and a co-located IR proximity sensor and detects a background "room temperature" via the thermal sensor.

Moving to stage 705, the device 210 determines whether the IR proximity sensor indicates a short-distance hover event; that is, where a user's hand or finger resides detectably near the IR proximity sensor without touching it. When a short-distance hover event is detected, the process 700 moves forward to stage 707 wherein the device 210 designates a temperature reading during the hover event as "hand temperature."

The device 210 then uses the difference between the hand temperature and the room temperature at stage 709 to adjust the thresholds for presence and gesturing, e.g., with smaller differences between hand temperature and room temperature resulting in lower thresholds, and negative differences resulting in negative difference thresholds. Once the hover event has ceased, as determined at stage 711, the process 700 moves to stage 713 to apply the updated thresholds. From stage 713, the process 600 returns to stage 603.

As can be seen in the foregoing processes 400, 500, 600 and 700, various sensor combinations may be used to implement the disclosed principles. FIGS. 2-3 show one possible configuration, with the secondary sensor 207 located adjacent to the thermal sensor 205. The secondary sensor 207 may be an IR-proximity sensor or a capacitive sensor as discussed above.

However, as noted above, the secondary sensor may also be a capacitive ring sensor as shown in FIG. 8. This figure, which is a schematic front view of an example device 810, shows the example device 810 having a capacitive ring sensor 802 surrounding or co-located with a thermal sensor 804 on the device screen 801.

Although various sensor combinations have been described herein, it will be appreciated that the described sensor combinations and associated procedures are not mutually exclusive, that is, elements of the disclosed embodiments may be combined or substituted for one another as desired. Moreover, the described secondary sensors are simply examples, and any other detection means may be used. This would include, for example, ultrasonic sensors, RADAR sensors, light sensors, cameras, and so on.

More generally, it will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof

We claim:

1. A method of calibrating presence and gesture detection in a mobile electronic communications device having a thermal sensor, the method comprising:
    sensing a background temperature via the thermal sensor and designating the sensed background temperature as room temperature;
    detecting via a secondary sensor located adjacent to the thermal sensor that a user has touched the thermal sensor;
    setting a temperature detected at the thermal sensor just prior to the detected touch as hand temperature;
    determining a difference between the hand temperature and the room temperature; and
    calibrating presence and gesture detection for the device based on the determined difference.

2. The method in accordance with claim 1, wherein the secondary sensor comprise a capacitive sensor.

3. The method in accordance with claim 2, wherein the capacitive sensor comprises a capacitive ring surrounding a lens of the thermal sensor.

4. The method in accordance with claim 1, wherein the secondary sensor comprises an IR (infrared) proximity sensor.

5. The method in accordance with claim 1, wherein the thermal sensor comprises a thermopile.

6. The method in accordance with claim 1, wherein the secondary sensor comprises at least one of an ultrasonic sensor, a RADAR sensor, a light sensor, and a camera.

7. The method in accordance with claim 1, wherein the thermal sensor includes a lens and wherein touching the thermal sensor comprises touching the lens of the thermal sensor.

8. A method of calibrating presence and gesture detection in a mobile electronic communications device having a thermal sensor, the device comprising:
    sensing a background temperature via the thermal sensor and designating the sensed background temperature as room temperature;
    determining via a secondary sensor that a user appendage is close to but not touching the thermal sensor;
    setting a temperature detected while the user appendage is close to but not touching the thermal sensor as hand temperature;
    determining a difference between the hand temperature and the room temperature; and
    calibrating presence and gesture detection for the device based on the determined difference.

9. The method in accordance with claim 8, wherein the secondary sensor comprises a capacitive sensor.

10. The method in accordance with claim 9, wherein the capacitive sensor comprises a capacitive ring surrounding a lens of the thermal sensor.

11. The method in accordance with claim 8, wherein the secondary sensor comprises an IR (infrared) proximity sensor.

12. The method in accordance with claim 8, wherein the thermal sensor comprises a thermopile.

13. The method in accordance with claim 8, wherein the secondary sensor comprises at least one of an ultrasonic sensor, a RADAR sensor, a light sensor, and a camera.

14. The method in accordance with claim 8, wherein the thermal sensor includes a lens and wherein touching the thermal sensor comprises touching the lens of the thermal sensor.

15. A method of calibrating presence and gesture detection in a mobile electronic communications device having a thermal sensor, the device comprising:
   sensing a background temperature via the thermal sensor and designating the sensed background temperature as room temperature;
   determining that a user appendage is touching the thermal sensor by detecting a start of a thermal transfer at the thermal sensor that is indicative of contact between the user and a lens of the thermal sensor;
   setting a temperature detected immediately prior to the start of the thermal transfer as hand temperature;
   determining a difference between the hand temperature and the room temperature; and
   calibrating presence and gesture detection for the device based on the determined difference.

16. The method in accordance with claim 15, wherein the thermal sensor comprises a thermopile.

* * * * *